UNITED STATES PATENT OFFICE.

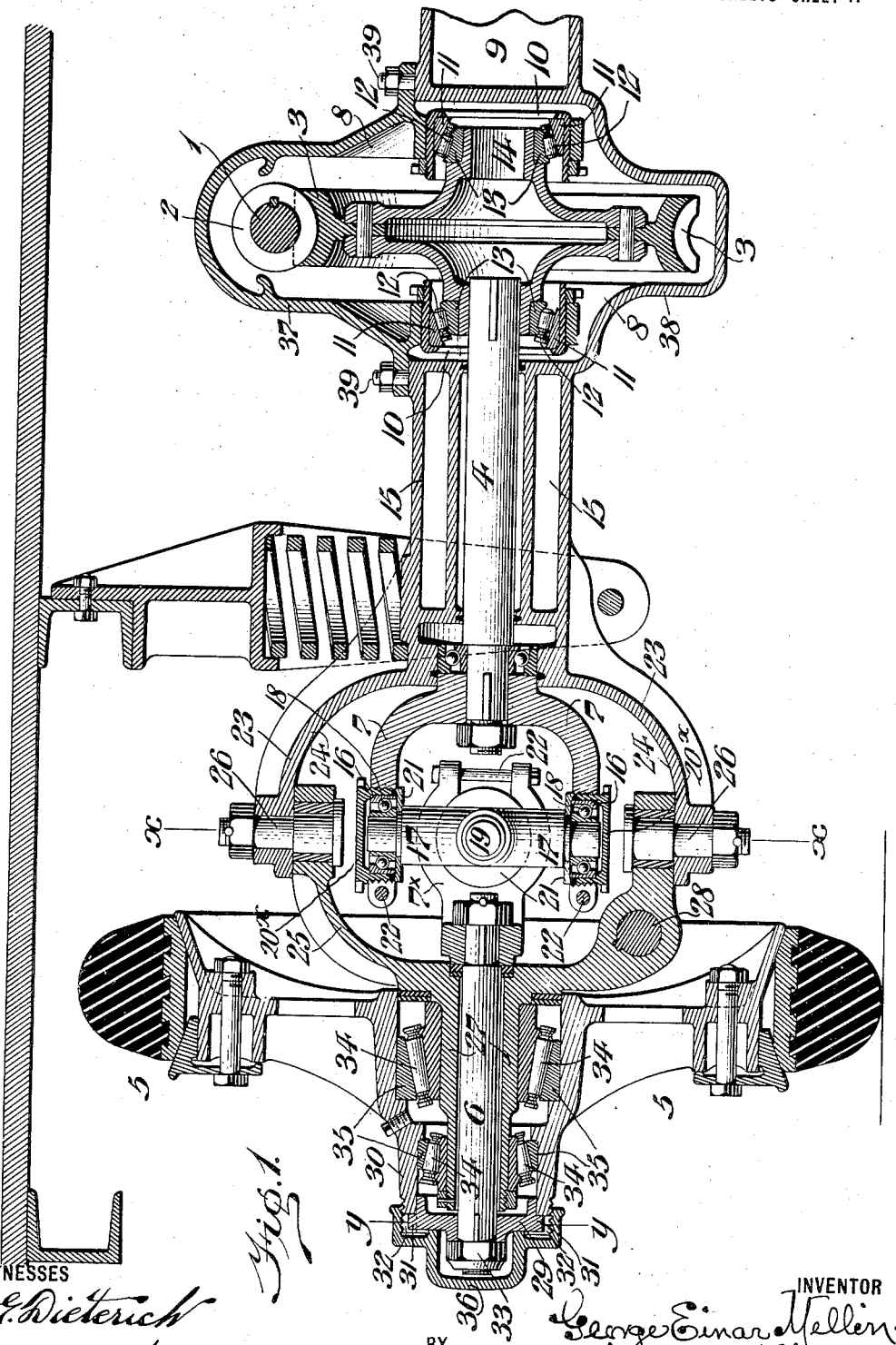

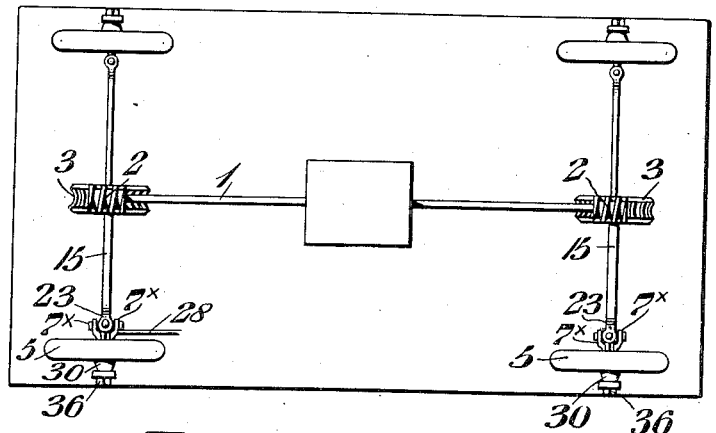
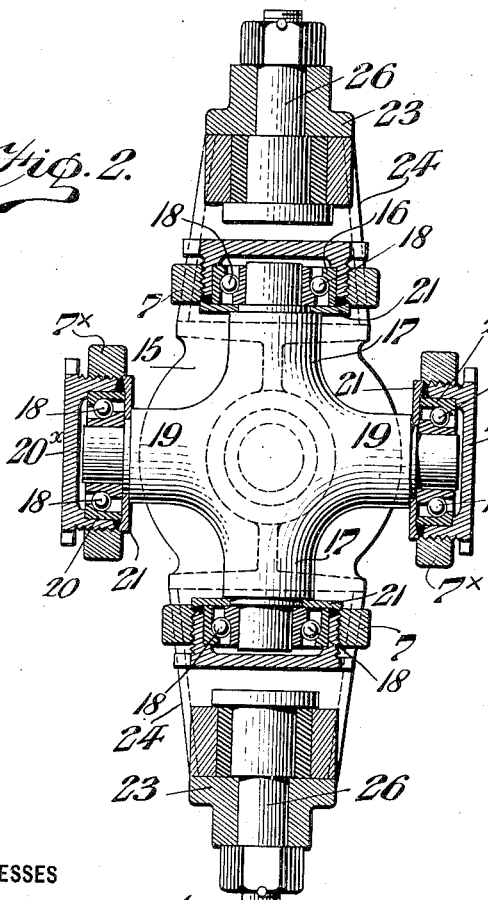
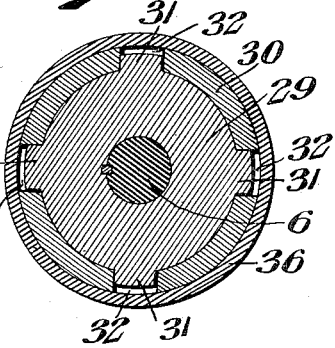

GEORGE EINAR MELLIN, OF PHILADELPHIA, PENNSYLVANIA.

BALL-BEARING.

1,179,949.  Specification of Letters Patent.  Patented Apr. 18, 1916.

Application filed February 26, 1914. Serial No. 821,125.

*To all whom it may concern:*

Be it known that I, GEORGE EINAR MELLIN, a citizen of the United States of America, residing in the city and county of Philadelphia, State of Pennsylvania, have invented a new and useful Ball-Bearing, of which the following is a specification.

My invention relates to an improvement in the ball bearings of a running and steering gear of an auto or other vehicle, the same embodying novel means, including a joint of the order of universal, for imparting rotatable power to a wheel of the vehicle, and permitting the turning of the same for steering purposes.

It consists of novel features of construction as will be hereafter designated by the claims.

The invention is satisfactorily illustrated in the accompanying drawing, but the important instrumentalities thereof may be varied, and so it is to be understood that the invention is not limited to the specific details shown and described.

Figure 1 represents a longitudinal section of the running and steering gear of an auto-vehicle embodying my invention. Fig. 2 represents a transverse section of a portion on line $x$—$x$ Fig. 1. Fig. 3 represents a diametrical section of a portion on line $y$—$y$ Fig. 1. Fig. 4 represents a top or plan view of certain members of the device on a reduced scale.

Similar numerals of reference indicate corresponding parts in the figures.

Referring to the drawings:—1 designates the driving shaft of the vehicle, and 2 designates a worm which is keyed or otherwise secured thereto and adapted to mesh with the worm wheel 3, the latter being connected with the section or spindle 4 of the power transmission shaft of the wheel 5, it being noticed that said section 4 is connected with an auxiliary spindle or section 6 of said shaft by means of the member 7, $7^x$, of a joint variously named as universal, gimbal, tumbling, flexible, etc., whereby said section 6 and consequently the wheel 5 may be turned with its bearings for steering purposes, the power of the section 4 may be transmitted to said section 6 and the wheel 5 to rotate the latter and propel the vehicle.

The worm wheel 3, worm 2, and portion of the driving shaft 1 are contained in the casing or housing 8 which is connected with the portion 9 of the frame or running gear of the vehicle, and with a bolster to be hereinafter referred to.

Within the housing 8 are the collars 10 which are on opposite sides of the worm wheel 3, and contain the bearings 11, for the rollers 12, which are adapted to engage with the bearings 13, on the hub 14, of the worm wheel 3, by which provision, said wheel will rotate with ease and reduced friction.

The shaft section 4 has its bearings in the bolster 15 which extends laterally outward from the housing 8 and is bolted and otherwise firmly secured to the latter.

The members 7 of the knuckle joint are of the form of arms whose terminals are provided with the boxes 16 within which are mounted the journals of the rock shaft 17, the same having ball bearings 18 in said boxes whereby said shaft may rotate freely in said boxes in the turning of the wheel 5 for steering purposes, while said shaft rotates with the member 7 of the joint. Connected with said shaft 17 and crossing the same is a rock shaft 19, whose journals are mounted in boxes 20 on the member $7^x$ of the knuckle or universal joint, said member being of the form of arms which are keyed or otherwise connected with the end of the section 6 of the power transmission shaft.

Over the boxes 16 and 20 are the threaded caps $20^x$ which are adapted to be screwed to the wall of the opening in the member in which the journals of the rock shafts are received. The inner ends of said boxes are seated on plates 21 while the outer ends of said boxes are engaged by said caps $20^x$ whereby the boxes may be held in adjusted position on said plates, the latter and said caps acting as closures for the ends of the boxes respectively serving to prevent the entrance of dust, dirt, etc. to said boxes and the loss of the lubricant of the journals therefrom. The ends of the members 7—$7^x$ are bifurcated so as to embrace the caps 20ˣ, and they are provided with screw bolts 22 whereby said ends may be clamped tightly on the caps, thus consequently connecting the members 7, 7ˣ, with the respective boxes. By loosening the bolts 22 the caps may be unscrewed, whereby access is had to the boxes 16 and 20 to remove the same. Then the wheel with the universal coupling fork and its shaft may be detached from the other members of the device without disturbing the same, while also permitting the reassembling of said parts in a convenient manner.

Stationarily connected with the outer terminal of the bolster 15 is the shaft bearing 23, which is formed in sections 24 and 25, the inner ends whereof meet and are connected by the bolts 26 which are in a line centered with the rock shaft, so that the section 25 may turn on said bolts in harmony with said rock shaft, when the latter is brought into vertical position by the rotation of the knuckle or universal joint member 7, it being noticed that the shaft section 6 is mounted in the sleeve 27 which is firmly connected with the housing section 25, the latter having connected with it the member 28 which is attached to the steering mechanism of the vehicle, whereby when said member 28 is operated, the housing section 25 moves with it. This communicates motion to the joint member 7ˣ, and the rock shafts 17 and 19, the shaft that is vertical, turning in the boxes on the respective members 7 or 7ˣ, but the running of the shaft section 6 is not interfered with, as the shaft section 4 rotates the joint member 7, the rock shafts 17 and 19, and consequently said shaft section 6, regardless of the change in the angle of said section 6, occasioned by the steering, it being noticed that in steering, said rock shafts assume alternately vertical and horizontal positions, and when either of said rock shafts is in the vertical position, the same will turn in its boxes on the respective members 7 or 7ˣ, due to the steering motion imparted to the wheel by the shaft section 6, and section 25 of the housing which latter receives its motion from the steering member 28, as has been stated.

The outer end of the shaft section 6 has connected with it, the cap 29, which is fitted to the outer end of the hub 30 of the wheel 5, and has lugs 31 radiating therefrom, the same entering slots 32 in said hub thus interlocking said cap with said hub whereby the motion of said shaft section is imparted to said cap and consequently to the wheel 5 and thus the running of the latter is occasioned. The cap is retained in place by the nut 33, which is screwed to the section 6, and tightens against said cap.

Interposed between the sleeve or bearing 27 of the shaft section 6 and the hub 30 of the wheel 5 are the rollers 34 and bearings 35 therefor, thus assisting the wheel to rotate with ease and less friction, and support the same steadily on the sleeve or bearing 27.

The outer hub of the wheel has connected with it the chambered nut 36 for closing and covering the parts within the same to prevent dust, dirt, etc. reaching said parts. In order to provide convenient access to the interior of the housing 8, and consequently to the gearing 2, 3, and other members therein, I form the walls of said housing of separate sections 37, 38, the section 38 being integral with the portion 9 of the frame, and the bolster 15, the sections being firmly connected by the bolts 39 and suitable nuts therein, the effect of which is evident.

The bearing rings or boxes 16 of the ball bearing each embody two rings one within the other, each having an annular offset and the two rings oppositely disposed so as to hold the balls 18 in position. The same is true of the boxes 20, as will be seen from said Fig. 2.

Having thus described my invention what I claim as new and desire to secure by Letters Patent, is:—

1. In a running gear of the character stated, a rotatable member, the same having a journal thereon, a box surrounding said journal, a plate at the base of said journal adapted to support said box, balls between the sections of said box, an annular clamping member, a cap adapted to be screwed to said clamping member to engage one of the sections of said box and cover said journal, and a screw bolt removable to permit removal of said cap to allow access to said box.

2. In a running gear of the character stated, a rotatable member, the same having a journal thereon, a plate at the base of said journal, a box surrounding said journal and adapted to be supported on said plate, balls between the sections of said box, an annular clamping member, a cap adapted to be screwed to said clamping member to engage one of the sections of said box and cover said journal, said rotatable member being formed with a bifurcation which is adapted to embrace said cap, and a bolt in the terminal of said bifurcation adapted to tighten said bifurcation on said cap.

3. In a running gear of the character stated, a rotatable member having a journal, concentric rings around said journal, bearing balls between said rings, a box, a cap fitted over said box, a member within one arm of which said box is supported, a cap over said box and threaded to the wall of an opening in the member in which the journal of said shaft is received, and a plate on which the inner end of said box is seated.

4. In a running gear of the character stated, a rotatable member having a journal, a plate surrounding said journal, a box composed of concentric rings with oppositely disposed annular shoulders, bearing
5 balls between said rings and confined between said shoulders, an internally threaded ring and a cap having a threaded flange interposed between the outermost ring and the inner face of said threaded ring and having engagement with the latter.

GEORGE EINAR MELLIN.

Witnesses:
    JOHN A. WIEDERSHEIM,
    N. BUSSINGER.